(12) United States Patent
Ziegler et al.

(10) Patent No.: US 8,728,564 B2
(45) Date of Patent: May 20, 2014

(54) POWDER MIX AND A METHOD FOR PRODUCING A BUILDING PANEL

(75) Inventors: Göran Ziegler, Viken (SE); Hans Persson, Perstorp (SE); Rickard Rittinge, Viken (SE)

(73) Assignee: Valinge Innovation AB, Viken (SE)

( * ) Notice: Subject to any disclaimer, the term of this patent is extended or adjusted under 35 U.S.C. 154(b) by 0 days.

(21) Appl. No.: 13/444,604

(22) Filed: Apr. 11, 2012

(65) Prior Publication Data

US 2012/0263878 A1  Oct. 18, 2012

Related U.S. Application Data

(60) Provisional application No. 61/474,485, filed on Apr. 12, 2011.

(30) Foreign Application Priority Data

Apr. 12, 2011  (SE) .................................... 1150321-6

(51) Int. Cl.
*B05D 3/02* (2006.01)

(52) U.S. Cl.
USPC ............... 427/8; 427/180; 427/201; 427/336; 427/370; 427/389.9; 427/392; 427/393; 427/394; 427/396; 427/397

(58) Field of Classification Search
None
See application file for complete search history.

(56) References Cited

U.S. PATENT DOCUMENTS

| | | |
|---|---|---|
| 2,587,064 A | 2/1952 | Rapson |
| 2,962,081 A | 11/1960 | Dobry et al. |
| 3,032,820 A | 5/1962 | Johnson |
| 3,135,643 A | 6/1964 | Michl |
| 3,308,013 A | 3/1967 | Bryant |
| 3,325,302 A | 6/1967 | Hosfeld |
| 3,345,234 A | 10/1967 | Jecker et al. |
| 3,426,730 A | 2/1969 | Lawson et al. |
| 3,463,653 A | 8/1969 | Letter |
| 3,486,484 A | 12/1969 | Bullough |
| 3,540,978 A | 11/1970 | Ames |
| 3,673,020 A | 6/1972 | De Jaeger |
| 3,846,219 A | 11/1974 | Kunz |
| 3,880,687 A | 4/1975 | Elmendorf et al. |
| 3,897,185 A | 7/1975 | Beyer |
| 3,914,359 A | 10/1975 | Bevan |
| 3,961,108 A | 6/1976 | Rosner et al. |

(Continued)

FOREIGN PATENT DOCUMENTS

| | | |
|---|---|---|
| AU | 80284/75 | 6/1975 |
| CA | 2 557 096 A1 | 7/2005 |

(Continued)

OTHER PUBLICATIONS

Ziegler, Göran, et al., U.S. Appl. No. 13/912,564, entitled "Bright Coloured Surface Layer," filed in the U.S. Patent and Trademark Office on Jun. 7, 2013.

(Continued)

*Primary Examiner* — Erma Cameron
(74) *Attorney, Agent, or Firm* — Buchanan Ingersoll & Rooney P.C.

(57) ABSTRACT

A powder mix layer for a building panel and a method for producing a building panel with a decorative surface produced from a powder mix layer with a controlled loss on cure.

22 Claims, 3 Drawing Sheets

(56) References Cited

U.S. PATENT DOCUMENTS

| | | | |
|---|---|---|---|
| 4,052,739 A | 10/1977 | Wada et al. |
| 4,093,766 A | 6/1978 | Scher et al. |
| 4,131,705 A | 12/1978 | Kubinsky |
| 4,313,857 A | 2/1982 | Blount |
| 4,337,290 A | 6/1982 | Kelly et al. |
| 4,430,375 A | 2/1984 | Scher et al. |
| 4,474,920 A | 10/1984 | Kyminas et al. |
| 5,034,272 A | 7/1991 | Lindgren et al. |
| 5,246,765 A | 9/1993 | Lussi et al. |
| 5,258,216 A | 11/1993 | Von Bonin et al. |
| 5,422,170 A | 6/1995 | Iwata et al. |
| 5,543,193 A | 8/1996 | Tesch |
| 5,569,424 A | 10/1996 | Amour |
| 5,601,930 A | 2/1997 | Mehta et al. |
| 5,604,025 A | 2/1997 | Tesch |
| 5,609,966 A | 3/1997 | Perrin et al. |
| 5,855,832 A | 1/1999 | Clausi |
| 5,925,296 A | 7/1999 | Leese |
| 5,942,072 A | 8/1999 | McKinnon |
| 6,103,377 A | 8/2000 | Clausi |
| 6,238,750 B1 | 5/2001 | Correll et al. |
| 6,468,645 B1 | 10/2002 | Clausi |
| 6,537,610 B1 | 3/2003 | Springer et al. |
| 6,773,799 B1 | 8/2004 | Persson et al. |
| 6,803,110 B2 | 10/2004 | Drees et al. |
| 6,926,954 B2 | 8/2005 | Schueren et al. |
| 6,991,830 B1 | 1/2006 | Hansson et al. |
| 7,022,756 B2 | 4/2006 | Singer |
| 7,485,693 B2 | 2/2009 | Matsuda et al. |
| 7,811,489 B2 | 10/2010 | Pervan et al. |
| 8,349,234 B2 | 1/2013 | Ziegler et al. |
| 8,349,235 B2 | 1/2013 | Pervan et al. |
| 8,419,877 B2 | 4/2013 | Pervan et al. |
| 8,431,054 B2 | 4/2013 | Pervan et al. |
| 8,480,841 B2 | 7/2013 | Pervan et al. |
| 8,481,111 B2 | 7/2013 | Ziegler et al. |
| 2001/0006704 A1 | 7/2001 | Chen et al. |
| 2001/0009309 A1 | 7/2001 | Taguchi et al. |
| 2002/0054994 A1* | 5/2002 | Dupre et al. ............ 428/349 |
| 2002/0100231 A1 | 8/2002 | Miller |
| 2003/0056873 A1 | 3/2003 | Nakos et al. |
| 2003/0102094 A1 | 6/2003 | Tirri et al. |
| 2004/0191547 A1 | 9/2004 | Oldorff |
| 2004/0202857 A1 | 10/2004 | Singer |
| 2004/0206036 A1 | 10/2004 | Pervan |
| 2004/0237436 A1 | 12/2004 | Zuber et al. |
| 2005/0079780 A1 | 4/2005 | Rowe et al. |
| 2005/0252130 A1 | 11/2005 | Martensson |
| 2006/0008630 A1 | 1/2006 | Thiers et al. |
| 2006/0024465 A1 | 2/2006 | Briere |
| 2006/0032175 A1 | 2/2006 | Chen et al. |
| 2006/0070321 A1 | 4/2006 | Au |
| 2006/0145384 A1 | 7/2006 | Singer |
| 2006/0183853 A1 | 8/2006 | Sczepan |
| 2007/0166516 A1 | 7/2007 | Kim et al. |
| 2007/0184244 A1 | 8/2007 | Doehring |
| 2007/0207296 A1 | 9/2007 | Eisermann |
| 2007/0218260 A1 | 9/2007 | Miclo et al. |
| 2007/0224438 A1 | 9/2007 | Van Benthem et al. |
| 2007/0256804 A1 | 11/2007 | Garcis Espino et al. |
| 2008/0000417 A1 | 1/2008 | Pervan et al. |
| 2008/0032120 A1 | 2/2008 | Braun |
| 2008/0090032 A1 | 4/2008 | Perrin et al. |
| 2008/0176039 A1 | 7/2008 | Chen et al. |
| 2008/0263985 A1 | 10/2008 | Hasch et al. |
| 2009/0124704 A1 | 5/2009 | Jenkins |
| 2009/0155612 A1 | 6/2009 | Pervan et al. |
| 2009/0208646 A1 | 8/2009 | Kreuder et al. |
| 2009/0311433 A1 | 12/2009 | Wittmann |
| 2010/0092731 A1 | 4/2010 | Pervan et al. |
| 2010/0223881 A1 | 9/2010 | Kalwa |
| 2010/0291397 A1 | 11/2010 | Pervan et al. |
| 2010/0300030 A1 | 12/2010 | Pervan et al. |
| 2010/0319282 A1 | 12/2010 | Ruland |
| 2010/0323187 A1 | 12/2010 | Kalwa |
| 2010/0330376 A1 | 12/2010 | Trksak |
| 2011/0175251 A1 | 7/2011 | Ziegler et al. |
| 2011/0177319 A1 | 7/2011 | Ziegler et al. |
| 2011/0177354 A1 | 7/2011 | Ziegler et al. |
| 2011/0189448 A1 | 8/2011 | Lindgren et al. |
| 2011/0247748 A1 | 10/2011 | Pervan et al. |
| 2011/0250404 A1 | 10/2011 | Pervan et al. |
| 2011/0293823 A1 | 12/2011 | Bruderer et al. |
| 2011/0293906 A1 | 12/2011 | Jacobsson |
| 2012/0263965 A1 | 10/2012 | Persson et al. |
| 2012/0264853 A1 | 10/2012 | Ziegler et al. |
| 2012/0308774 A1 | 12/2012 | Persson et al. |
| 2013/0092314 A1 | 4/2013 | Ziegler et al. |
| 2013/0095315 A1 | 4/2013 | Pervan et al. |
| 2013/0189534 A1 | 7/2013 | Pervan et al. |

FOREIGN PATENT DOCUMENTS

| | | |
|---|---|---|
| CH | 298894 A | 5/1954 |
| CH | 298 894 | 8/1954 |
| DE | 1 815 312 A1 | 7/1969 |
| DE | 7148789 | 4/1972 |
| DE | 7148789 U | 4/1972 |
| DE | 29 39 828 A1 | 4/1981 |
| DE | 33 34 921 A1 | 4/1985 |
| DE | 42 36 266 A1 | 5/1993 |
| DE | 202 14 532 U1 | 2/2004 |
| DE | 103 31 657 A1 | 2/2005 |
| DE | 20 2004 003 061 U1 | 7/2005 |
| DE | 10 2004 050 278 A1 | 4/2006 |
| DE | 20 2006 007 797 U1 | 8/2006 |
| DE | 10 2005 046 264 A1 | 4/2007 |
| DE | 10 2006 024 593 A1 | 12/2007 |
| EP | 0 129 430 A2 | 12/1984 |
| EP | 0 129 430 B1 | 1/1990 |
| EP | 0 355 829 A2 | 2/1990 |
| EP | 0 611 408 A1 | 12/1993 |
| EP | 0 592 013 A2 | 4/1994 |
| EP | 0 656 443 A1 | 6/1995 |
| EP | 0 611 408 B1 | 9/1996 |
| EP | 0 732 449 A1 | 9/1996 |
| EP | 0 744 477 A2 | 11/1996 |
| EP | 0 914 914 A2 | 5/1999 |
| EP | 0 732 449 B1 | 8/1999 |
| EP | 0 744 477 B1 | 1/2000 |
| EP | 1 193 288 A1 | 4/2002 |
| EP | 1 209 199 A1 | 5/2002 |
| EP | 1 249 322 A1 | 10/2002 |
| EP | 1 454 763 A2 | 9/2004 |
| EP | 1 498 241 A2 | 1/2005 |
| EP | 1 507 664 A1 | 2/2005 |
| EP | 1 507 664 B1 | 2/2005 |
| EP | 1 584 378 A1 | 10/2005 |
| EP | 1 681 103 A2 | 7/2006 |
| EP | 1 690 603 A1 | 8/2006 |
| EP | 1 847 385 A1 | 10/2007 |
| EP | 1 961 556 A1 | 8/2008 |
| EP | 1 985 464 A1 | 10/2008 |
| EP | 1 997 623 A1 | 12/2008 |
| EP | 2 025 484 A1 | 2/2009 |
| EP | 1 454 763 B1 | 8/2009 |
| EP | 2 226 201 A1 | 9/2010 |
| EP | 2 246 500 A2 | 11/2010 |
| EP | 2 264 259 A2 | 12/2010 |
| EP | 2 272 667 A1 | 1/2011 |
| EP | 2 272 668 A1 | 1/2011 |
| EP | 2 305 462 A1 | 4/2011 |
| EP | 1 847 385 B1 | 9/2011 |
| FR | 2 873 953 A1 | 2/2006 |
| GB | 984 170 A | 2/1965 |
| GB | 1090450 | 11/1967 |
| JP | 2-229002 A | 9/1990 |
| JP | 11-291203 A | 10/1999 |
| JP | 2001-287208 A | 10/2001 |
| JP | 2003-311717 A | 11/2003 |
| JP | 2003-311718 A | 11/2003 |
| JP | 2005-034815 A | 2/2005 |
| JP | 2005-074682 A | 3/2005 |
| JP | 2005-170016 A | 6/2005 |

(56) References Cited

FOREIGN PATENT DOCUMENTS

| | | |
|---|---|---|
| JP | 2005-219215 A | 8/2005 |
| JP | 3705482 B2 | 10/2005 |
| JP | 2005-307582 A | 11/2005 |
| JP | 2007-216692 A | 8/2007 |
| JP | 2007-268843 A | 10/2007 |
| JP | 2008-188826 A | 8/2008 |
| SE | 469 326 B | 6/1993 |
| WO | WO 92/06832 A1 | 4/1992 |
| WO | WO 94/00280 A1 | 1/1994 |
| WO | WO 95/06568 A1 | 3/1995 |
| WO | WO 00/22225 A1 | 4/2000 |
| WO | WO 00/44576 A1 | 8/2000 |
| WO | WO 01/48333 A1 | 7/2001 |
| WO | WO 01/64408 A1 | 9/2001 |
| WO | WO 01/92037 A2 | 12/2001 |
| WO | WO 02/42167 A2 | 5/2002 |
| WO | WO 03/078761 A1 | 9/2003 |
| WO | WO 03/095202 A1 | 11/2003 |
| WO | WO 2004/042168 A1 | 5/2004 |
| WO | WO 2004/050359 A1 | 6/2004 |
| WO | WO 2005/054600 A1 | 6/2005 |
| WO | WO 2005/066431 A2 | 7/2005 |
| WO | WO 2006/007413 A1 | 1/2006 |
| WO | WO 2006/013469 A1 | 2/2006 |
| WO | WO 2006/043893 A1 | 4/2006 |
| WO | WO 2007/042258 A1 | 4/2007 |
| WO | WO 2007/059294 A2 | 5/2007 |
| WO | WO 2009/065768 A1 | 5/2009 |
| WO | WO 2009/065769 A2 | 5/2009 |
| WO | WO 2009/065769 A3 | 5/2009 |
| WO | WO 2009/124704 A | 10/2009 |
| WO | WO 2010/094500 A1 | 8/2010 |
| WO | WO 2011/141851 A2 | 11/2011 |
| WO | WO 2012/004699 A2 | 1/2012 |

OTHER PUBLICATIONS

Pervan, Darko, et al., U.S. Appl. No. 13/912,587, entitled "Powder Overlay," filed in the U.S. Patent and Trademark Office on Jun. 7, 2013.

Pervan, Darko, et al., U.S. Appl. No. 13/793,971, entitled "Wood Fibre Based Panels with a Thin Surface Layer," filed in the U.S. Patent and Trademark Office on Mar. 11, 2013.

Vetter, Georg, et al., U.S. Appl. No. 13/804,355, entitled "Method for Producing a Building Panel," filed in the U.S. Patent and Trademark Office on Mar. 14, 2013.

Persson, Hans, et al., U.S. Appl. No. 61/557,643, entitled "Scattering," filed in the U.S. Patent and Trademark Office on Nov. 9, 2011.

Håkansson, Niclas, et al., U.S. Appl. No. 61/557,734, entitled "Powder Based Balancing Layer," filed in the U.S. Patent and Trademark Office on Nov. 9, 2011.

Vetter, Georg, et al., U.S. Appl. No. 61/612,672, entitled "Method for Producing a Building Panel," filed in the U. S. Patent and Trademark Office on Mar. 19, 2012.

Parquet International, "Digital Printing is still an expensive process," Mar. 2008, cover page/pp. 78-79, www.parkettmagazin.com.

Floor Daily, "Shaw Laminates: Green by Design," Aug. 13, 2007, 1 pg, Dalton, GA.

International Search Report (Form PCT/ISA/210) issued in corresponding PCT/SE2012/050384, mailed Jul. 4, 2012, 7 pages, ISA/SE, Stockholm, Sweden.

Engstrand, Ola (Contact)/Valinge Innovation, Technical Disclosure entitled "Fibre Based Panels With a Wear Resistance Surface," Nov. 17, 2008, IP.com No. IPCOM000176590D, IP.com PriorArtDatabase, 76 pages.

Engstrand, Ola (Contact)/Valinge Innovation, Technical Disclosure entitled "WFF Embossing," May 15, 2009, IP.com No. IPCOM000183105D, IP.com PriorArtDatabase, 36 pages.

Engstrand, Ola (Contact)/Valinge Innovation, Technical Disclosure entitled "VA063 VA064 Scattering and Powder Backing," Nov. 11, 2011, IP.com No. IPCOM000212422D, IP.com PriorArtDatabase, 34 pages.

Pervan, Darko, et al., U.S. Appl. No. 61/751,393, entitled "Method of Producing a Building Panel and a Building Panel," filed in the U.S. Patent and Trademark Office on Jan. 11, 2013.

Pervan, Darko, et al., U.S. Appl. No. 14/089,928 entitled "Recycling of Laminate Floors," filed in the U.S. Patent and Trademark Office on Nov. 26, 2013.

Pervan, Darko, et al., U.S. Appl. No. 14/151,973 entitled "A Method of Producing a Building Panel and a Building Panel", filed in the U.S. Patent and Trademark Office on Jan. 10, 2014.

* cited by examiner

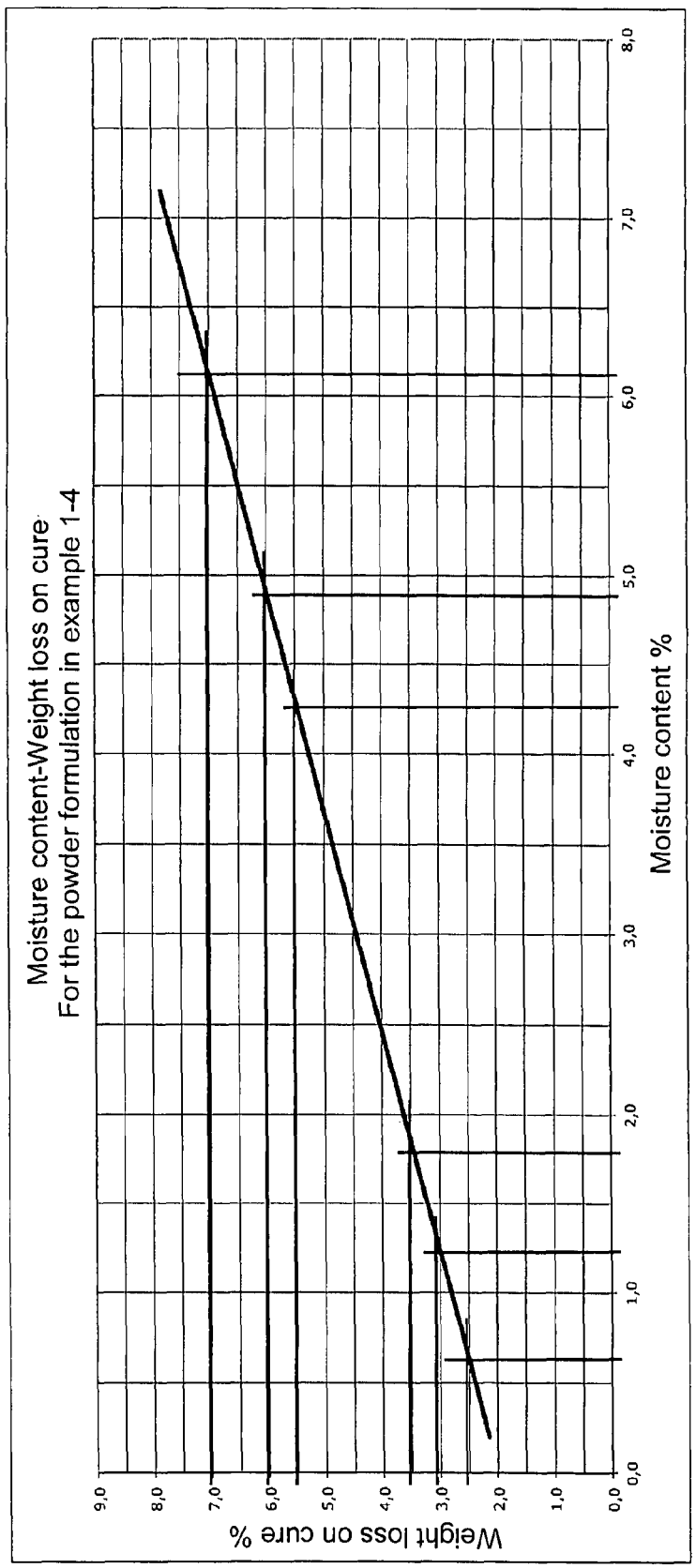

POWDER MIX AND A METHOD FOR PRODUCING A BUILDING PANEL

CROSS REFERENCE TO RELATED APPLICATIONS

The present application claims the benefit of Swedish Application No. 1150321-6, filed on Apr. 12, 2011, and U.S. Provisional Application No. 61/474,485, filed on Apr. 12, 2011. The entire contents of each of Swedish Application No. 1150321-6, and U.S. Provisional Application No. 61/474,485 are hereby incorporated herein by reference.

TECHNICAL FIELD

The disclosure generally relates to the field of fibre-based panels with a wear resistant decorative surface layer, particularly building panels and more particularly floor panels. The disclosure relates to a building panel with such wear resistance decorative surface and to production methods for such panels and a mixed/prefab layer for such methods and panels.

KNOWN TECHNIQUES

Recently new "paper free" Wood Fibre Floor (WFF) types have been developed with solid surfaces comprising a substantially homogenous mix of fibres, binders and wear resistant particles. Such a new type of panel called Wood Fibre Floor (WFF) is disclosed in WO2009/065769, which shows both products and methods to produce such a product.

The wear resistant particles are preferably aluminium oxide particles, the binders are preferably thermosetting resins such as amino resins and the fibres are preferably wood based. Other suitable wear resistant materials are for example silica or silicon carbide. In most applications decorative particles such as for example colour pigments are included in the homogenous mix. In general all these materials are preferably applied in dry form as a mixed powder on a HDF core and cured under heat and pressure to a 0.1-1.0 mm solid layer.

Powder technology is very suitable to produce solid decorative surface layer, which are much thicker than conventional laminate surface layers. Such solid powder based layers create a much higher tension on the panel when they swell or shrink and balancing is a problem. It is therefore difficult to produce a panel with a thick and a high quality surface, which is also stable and flat in variable moisture conditions. Furthermore, pores may be formed in the surface layer resulting in weak stain resistance.

SUMMARY OF THE INVENTION

An objective of certain embodiments of the invention is to improve the known Wood Fibre Floor (WFF) panels. A further object is to provide a product preferably having a width cupping of −0.15% to +0.20% under test conditions according to ISO 24339:2006(E), and/or a water vapour permeability of less than 3 $g/m^2*24$ hours according to EN 12572 and/or a surface staining of 5(5) according to EN438 based on test using a permanent marker.

This may be achieved by a powder mix layer for the decorative surface layer of a WFF-panel with a controlled loss on cure and a method of producing a building panel.

By loss on cure is in this application meant the weight loss, calculated as weight percentage of the original weight, occurring when heating the powder at 160° C. for 5 minutes. The weight loss corresponds to moisture released from the powder. Under these conditions the released moisture consists of two parts. The first part is the free moisture formed from water and/or other substances having a boiling point below 160° C. being trapped in the powder and the second part origins from the cross linking of the binder. Melamine formaldehyde resin cures at 160° C. and the resin cross-links via a condensation reaction, i.e. water is released by the condensation reaction.

By moisture content is meant the weight loss, when the powder is dried under milder conditions at ambient temperatures and only the free water in the powder is released, without curing the resin.

If the loss on cure is too low the powder mix layer will not be completely impregnated by the binder when the binder is in the fluid state during the pressing. An inferior impregnation of the powder mix layer results in discolouration of the decorative surface of the WFF panel, due to pores close to the surface.

If the loss on cure on the other hand is too high, a high amount of pores in the WFF layer are created during the pressing. The pores give a poor resistance of surface staining and increased water/vapour permeability. Increased water/vapour permeability can result in increased cupping of the panels under test conditions according to ISO 24339:2006 (E).

The loss on cure depends on the amount of binder in the powder mix layer, the moisture content in the powder mix layer when entering the WFF production line and the amount of powder stabilization fluid applied in the WFF production line. The loss on cure before pressing may be controlled by an in-line or off-line drying process in which the powder layer is dried. The drying may be carried out by heating, e.g., IR heating, preferably in-line, drying in a chamber, preferably in-line, or drying in a controlled climate, preferably off-line.

The drying process stabilizes the powder in the powder mix layer and applying a powder stabilization fluid may not be necessary.

If the drying process involves heating, the binder in the powder mix layer may be melted and the powder is stabilized by the melted binder. Thereby, the drying process may make the stabilization fluid redundant.

According to a first aspect of the invention a powder mix layer for producing a building panel with a loss on cure in the range of about 2.5 to about 7 wt-%, preferably about 3 to about 6 wt-% is provided.

A powder mix layer having a loss on cure in the above described range overcomes the above described disadvantages and exhibits improved stain resistance, water/vapour resistance and binder impregnation as described above.

The powder mix layer may have a loss on cure in the range of about 2 to about 7 wt-%, preferably in the range of about 4 to about 6 wt-%, preferably about 5 wt-%.

The powder mix is a substantially homogenous mix, which comprises in one embodiment wood fibres, preferably of HDF, a binder, preferably a melamine resin, and wear resistant particles, preferably a powder of silica, more preferably essentially of aluminium oxide. A more preferred loss on cure is about 3.5 wt-%, to 5.5 wt-%.

According to a second aspect of the invention, a method of producing a building panel is provided. The method comprises the steps of:
  applying a powder mix layer on a substrate; and
  applying heat and pressure to the powder mix layer and curing the powder mix layer having a loss on cure in the range of about 2 to about 7 wt-%, preferably in the range of about 4 to about 6 wt-%, more preferably about 5 wt-%, thereby obtaining a layer formed by the powder mix layer.

A preferred loss on cure is about 2.5 wt-% to about 7 wt-%.

A powder mix layer produced according to the inventive method wherein the powder mix layer has a loss on cure in the above described range overcomes the above described disadvantages and exhibits improved stain resistance, water/vapour resistance and binder impregnation as described above.

In one embodiment, a powder mix is chosen such that the powder mix already has a loss on cure in the above defined ranged. As an alternative, the loss on cure of the powder mix layer may be adjusted by for example applying a stabilisation fluid or by drying in order to change the moisture content of the powder mix. The relevant time for determining the loss on cure of the powder mix layer is the moment before applying heat and pressure.

By adjusting the binder content and the moisture content in the powder mix, and the amount of any added stabilization fluid, a desired loss on cure of the powder mix layer may be obtained. Furthermore, the loss on cure may be controlled by drying the mix, thereby adjusting the moisture content.

The curing performed by applying heat and pressure may be performed at high line speed and the powder layer withstands high acceleration and retardation forces created, at short press cycles of about 20 seconds.

The powder mix in the second aspect may be the same as the embodiments of the first aspect. Accordingly, the powder mix layer may comprise a substantially homogenous mix of wood fibres and a binder, preferably a thermosetting resin, more preferably melamine. The powder mix layer may further comprise wear resistant particles, preferably of aluminium oxide or of a silica powder.

The loss on cure is measured using a gravimetric method comprising heating the powder mix layer at 160° C. for five minutes.

The powder mix layer may be heated before pressing, preferably by IR heating, and preferably with an effect of about 15-25 kW/m. A preferred feeding speed in the range of about 1-4 m/min, most preferably about 3 m/min at an effect of about 20 kw.

Preferably, the substantially homogenous mix is conditioned before being applied in order to obtain the desired loss on cure of the powder mix layer.

In the curing step, the pressure applied may be in the range of about 20 kg/cm$^2$ to about 60 kg/cm$^2$, preferably about 40 kg/cm$^2$, and the temperature of the press plate may be in the range of about 160 to about 200° C., preferably about 180° C., The heat and pressure may be applied in the range of about 10 to about 200 seconds, preferably in the range of about 10-60 seconds, and as an example in about 40 seconds.

The powder mix layer may comprise wood fibres and a binder, preferably a thermosetting resin.

The method may comprise the further step of applying a stabilisation fluid, preferably water, on the powder mix.

The method may comprise the further step of drying the powder mix layer, preferably by applying heat with an effect of about 15-25 kW/m and a feeding speed in the range of about 1-4 m/min, preferably about 3 m/min.

The method may comprise the further steps of fixing the powder mix layer to the substrate, preferably by applying stabilisation fluid and drying with an effect of about 15-25 kW/m and a feeding speed in the range of about 1-4 m/min, preferably about 3 m/min.

The method may comprise the further step of adjusting the loss on cure of the powder mix layer by the step of applying the stabilisation fluid, or the step of drying, or a combination thereof such that the powder mix layer obtains the loss on cure in said range. Thereby, the loss on cure of the powder mix layer can be adjusted such that a loss on cure in the desired range can be obtained, even if the powder mix originally has a loss on cure outside the desired range.

The powder mix layer may be applied by scattering. The powder mix may be applied by an applying unit, preferably a scattering unit, which forms the powder mix layer.

The powder mix layer may be applied as a continuous powder mix sheet. Consequently, it is possible to produce a separate layer such as a continuous powder mix sheet. In this embodiment, the substrate may be a press belt, a release foil etc. The components of the powder mix is connected together but essentially uncured, in a separate process and in a separate production line. The separate layer may be based on carrier, e.g. a paper or a metal or plastic foil, but the powder mix may also only be bonded together by it self achieved by e.g. wetting with a fluid, preferably water and drying. The powder mix sheet may be stored and later applied on the core as a powder mix layer.

The substrate may be a core, preferably a wood-based core, more preferably a HDF or MDF board.

The layer may form a decorative surface layer arranged on the core.

A third aspect of the invention is a production line comprising an applying unit for applying a powder mix layer on a substrate, a pressing unit for applying heat and pressure on the powder mix layer and a conveyor that comprises conveyor units preferably with separately controllable feeding speed of the substrate. The production line may also comprise stabilisation units and/or drying units. The conveyor preferably comprises separate conveyor units at each of the production units. The separate conveyor units provide an enhanced control of the loss on cure, since the feeding speed at each production unit (the applying unit, stabilisation unit and/or drying unit) can be controlled and thereby it will be easier to control the amount of applied powder or stabilisation unit or degree of drying. Furthermore the separate conveyor units prevent moisture/water from being transported between the production units by the conveyor itself.

In all aspects the wood fibres may be both virgin, refined and/or processed, comprising lignin and without lignin, e.g. α-cellulose fibres or holocellulose. A mixture of refined and unrefined fibres may also be used. It is also contemplated that vegetable fibres as jute, linen, flax, cotton, hemp, bamboo, bagasse and sisal may be used. Also mineral fibres and carbon fibres may be used.

The applying unit is preferably a scattering device. The substrate is preferably an HDF or MDF board, which is preferably provided with a balancing layer.

BRIEF DESCRIPTION OF THE DRAWINGS

The invention will in the following be described in connection to preferred embodiments and in greater detail with reference to the appended exemplary drawings, wherein

FIG. 3 illustrates the relationship between moisture content and loss on cure for the formulation in Examples 1-4.

DETAILED DESCRIPTION OF EMBODIMENTS

Figure 1:
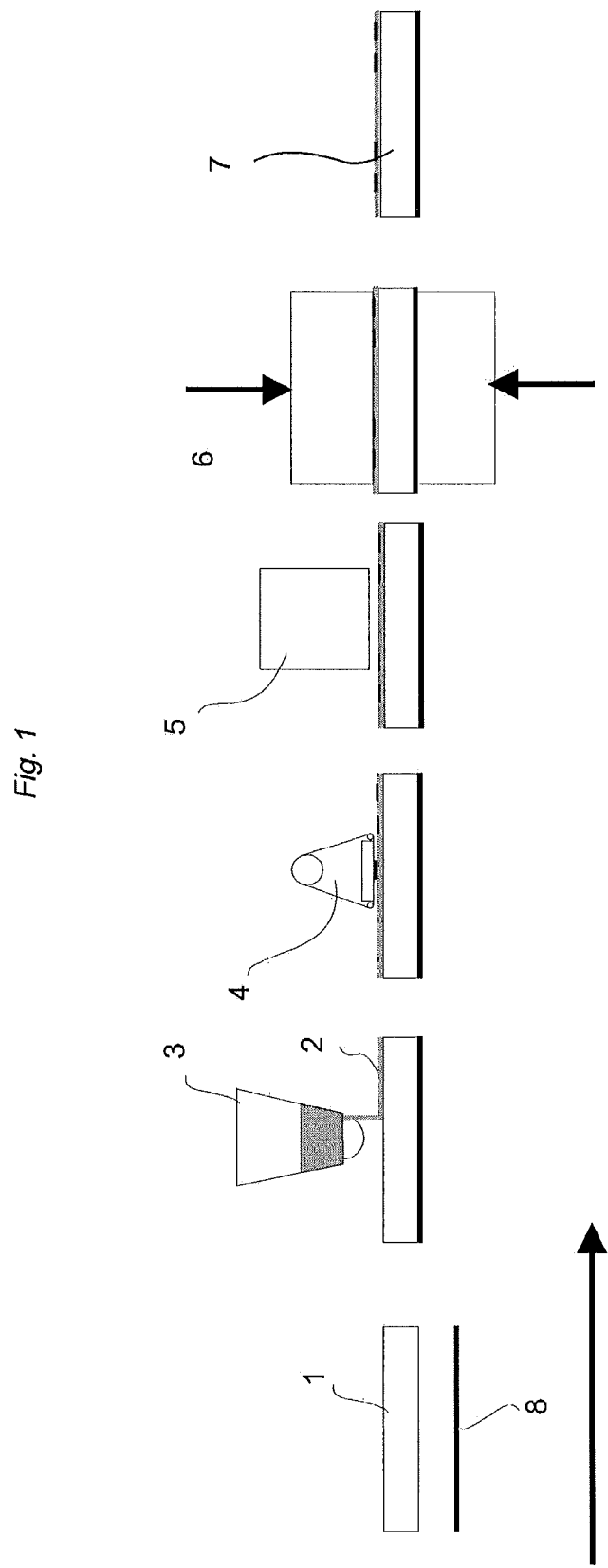
FIG. 1 illustrates a production line according to an embodiment of the invention.

A panel 7, which is described with reference to FIGS. 1 and 2, comprises according to one embodiment of the invention a wood fibre based core 1, an essentially homogenous decorative surface layer (transparent or non-transparent) 2 and preferably a balancing layer 8. The panel 7 is in one embodiment integrally formed in a production line (see FIG. 1) where the surface layer 2, the core 1 and the balancing layer 8 are formed in the same pressing operation 6.

Figure 2:
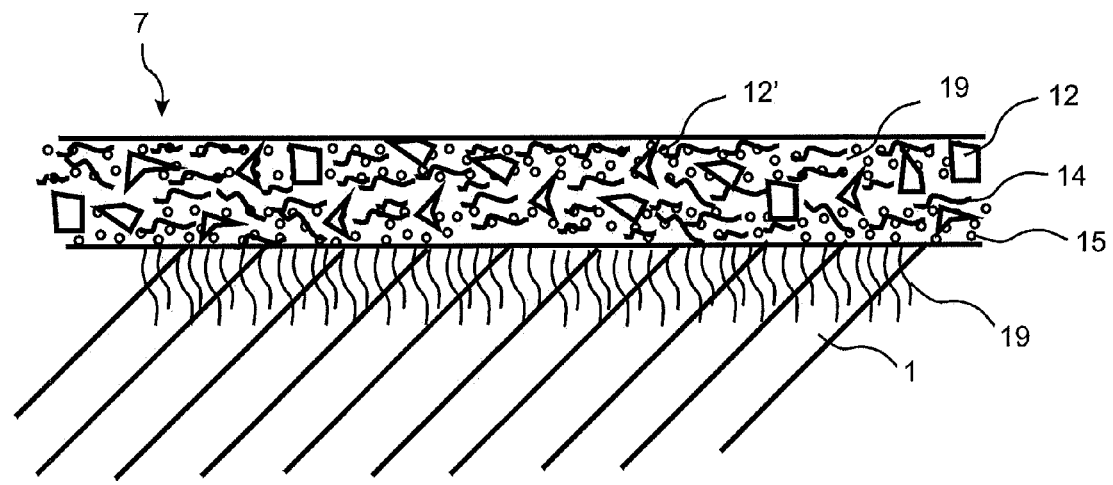
FIG. 2 illustrates a panel with a decorative layer according to an embodiment of the invention.

FIG. 2 shows the decorative surface layer and the core in more detail. The surface layer comprises a substantially homogenous mixture of fibres 14, small hard wear resistant particles 12, 12' and a binder 19. The fibres 14 are preferably wood fibres. The binder 19 is preferably a binder that cross-links by a condensation reaction. The binder is preferably a thermosetting resin such as amino-resins or phenolic resin. In one embodiment, the binder is melamine formaldehyde. The wear resistant particles 12,12' are preferably aluminium oxide particles. The surface layer preferably may also comprise pigment 15.

The surface layer may comprise colour pigments 15 and/or, optionally, other decorative materials or chemicals. Decorative materials include, for example, materials that may affect design aspect(s) the surface layer. Exemplary design materials include materials effecting texture, reflectivity, shine, luminescence, transparency, etc.

In methods according to embodiments of the invention preferably the same scattering 3 and pressing units 6 as disclosed in WO 2009/065769 or WO 2009/124704 are used, preferably together with a structured press plate in the method. Each of WO 2009/065769 and WO 2009/124704 are hereby incorporated by reference in its entirety.

FIG. 1 discloses a production line according to an embodiment of the invention. The production line comprises an applying unit 3, preferably a scattering unit for applying/scattering a powder mix 2 on the core 1, e.g. an HDF/MDF board, which is preferably already provided with a balancing layer 8. A stabilisation unit 4 for applying a stabilization fluid and a drying unit 5 for drying the powder mix layer are provided. A pressing unit 6 finally applies heat and pressure on the powder mix layer, the core and the balancing layer in order to cure the binder and thereby obtaining the finished building panel 7 with a decorative surface layer. The production line further comprises a conveyor (not shown) preferably comprising separate conveyor units such that the speed of the core 1 through the production line can be varied at the different units e.g. at the applying unit 3, the stabilisation unit 4 or at the drying unit 5. A suitable conveyor is a belt or roller conveyor.

A powder formulation can for example comprise an essentially homogenous powder mixture comprising 187.5 g/m² recycled HDF fibre with a moisture content of 5.2%, 62.5 g/m² Aluminium Oxide (ZWSK-180 ST, Treibacher Schleifmittel AG), 265,625 g/m² Melamine Formaldehyde resin (Prefere 4865, Dynea), 62.5 g/m² Titanium dioxide (Kronos 2190, Kronos) and 46,875 g/m² pigment (Heucosin G10512, Heubach).

The core of an HDF board preferably has a moisture content of 0-6%.

The scattering unit has the capacity of scattering of 100-1000 g/m² with a tolerance of +/−5% as measured using a calibration cup with an area of 100×100 mm cross- and length wise the board. The amount of stabilization fluid may vary from 0 up to 200 g/m².

The scattering unit comprises a needle belt and a scattering roller. The scattering roller is provided with needles in the range of about 30-120, preferably about 50-100, and most preferably about 70-90 needles per cm². The needle length is about 0.5-2.5 mm, preferably about 1-2 mm and most preferably about 1.5 mm. Several scattering unit machines may be used to even out differences in the applied powder mixture.

Furthermore, the scattering device may be provided with a needle belt with needles with a preferred length of about 15-20 mm, a preferred frequency in the range of about 500-1000 rpm preferably about 1000 rpm, and a stroke length of about +/−3 mm.

The stabilization unit may stabilize using steam, nozzle spray coating, ultra sonic spray coating, a stabilization sheet comprising a sheet based material with inherent stabilizing properties or a surface coverage providing the stabilizing properties.

Stabilization fluid may comprise solvents such as non-polar solvents, polar aprotic solvents and polar protic solvents or mixtures thereof. Preferred solvents are polar protic solvents such as isopropanol, ethanol and water. Most preferred is water.

The stabilization fluid can further comprise additives such as wetting agents, defoamers, release agents, anti-slip agents, anti-abrasives and catalysts. Decorative effects can also be added in the form of inks, dyes and effect pigments.

In examples 1-4 below the powder formulation was used comprising 34 weight-% recycled HDF fibre (Välinge Innovation Sweden), 10 weight-% Aluminium oxide (ZWSK 180-ST, Treibacher Schleifmittel AG), 50 weight-% Melamine Formaldehyde resin (Prefere 4865, Dynea), 2 weight-% Titanium dioxide (Kronos 2190, Kronos) and 4 weight-% pigment (G 6555 N, Heubach GmbH).

The relation between Weight Loss on Cure and the free moisture content, that is excluding the water released in the curing of the melamine resin, in the powders used in the examples, is shown in FIG. 3.

Depending on the loss cure of the powder mix applied to the substrate, a stabilization fluid may be applied and/or drying may be performed. If the loss on cure of the powder mix applied to the substrate is within the above described range, no stabilization fluid is to be added and no drying is to be performed. If the loss on cure of the powder mix applied to the substrate is outside the above described range, a stabilization fluid is to be added, or drying is to be performed, depending if the loss on cure is too low or too high, in order to obtain a powder mix having the desired loss on cure before applying heat and pressure.

Even if the loss on cure of the powder mix applied is within the above described range, it may be desired to apply a stabilization fluid in order to stabilize the powder layer. In order to adjust the loss on cure of the powder mix layer, subsequent drying may be required.

Alternatively, the binder content of the powder may also be adjusted in order to obtain the desired loss on cure of the powder mix layer.

Example 1

Powder Based Product Obtained Through Heat Compression of an Incorrectly Treated Powder, Comparative Example; No Drying and a Stabilization Fluid of Water (20 g/m²)

A powder based product comprising an HDF core with a thickness of 9.7 mm, a balancing paper, 550 g/m² of a scattered powder layer and 20 g/m² stabilisation fluid, giving an a loss on cure of 8 wt-%, was pressed in a short cycle press using a force of 40 kg/cm² for 37 seconds at a surface temperature on the upper press plate of 184° C. and a surface temperature on the lower press plate of 180° C. The press plate was a granite structure plate.

The resulting product was:
  a building panel with a solid surface having a width cupping outside −0.15% to +0.2% installed board according to ISO 24339:2006(E). Typical values obtained are −0.26% to +0.29%.
  staining of 3(5) according to EN438 based on test using a permanent marker
  water vapour permeability in excess of 5.3 g/m²*24 hours according to EN 12572

Example 2

Powder Based Product Obtained Through Heat Compression of a Treated Powder, Preferred Example, Drying and a Stabilization Fluid of Water (20 g/m²)

A powder based product comprising a HDF core with a thickness of 9.7 mm, a balancing paper, 550 g/m² of a scattered powder layer and 20 g/m² of stabilisation fluid was pressed in a short cycle press using a force of 40 kg/cm² for 37 seconds at a surface temperature on the upper press plate of 184° C. and a surface temperature on the lower press plate of 180° C. The press plate had a granite structure. Prior to pressing the powder was treated by an IR drying with an effect of 19 kW/m and a feeding speed of 2.7 m/min in order to obtain a loss on cure of 4.6 wt-% as measured using a gravimetric method comprising heating the treated powder at 160° C. for five minutes.

The resulting product was:
  a solid surface having a width cupping within −0.15% to +0.2% installed board according to ISO 24339:2006(E), typical values obtained are −0.07% to +0.17%.
  staining of 5(5) according to EN438 based on test using a permanent marker
  water vapour permeability lower than 1.1 g/m²*24 hours according to EN 12572.

Example 3

Powder Based Product Obtained Through Heat Compression of an Incorrectly Treated Powder, Comparative Example, Stabilization Fluid and Over Drying A powder based product comprising a HDF core with a thickness of 9.7 mm, a balancing paper and 550 g/m² of a scattered powder layer with 20 g/m² of stabilisation fluid, was pressed in a short cycle press using a force of 40 kg/cm² for 37 seconds at a surface temperature on the upper press plate of 184° C. and a surface temperature on the lower press plate of 180° C. The press plate had a granite structure. Prior to pressing the powder was treated by an IR drying process with an effect of 19 kW/m and a feeding speed of 1.5 m/min in order to obtain a loss on cure of 2.5 wt-% as measured using a gravimetric method comprising heating the treated powder at 160° C. for five minutes.

The resulting product was:
  a building panel with a solid surface having a width cupping inside −0.15% to +0.2% on installed board according to ISO 24339:2006(E)
  staining of 3(5) according to EN438 based on test using a permanent marker
  water vapour permeability of 2.5 g/m²*24 hours according to EN 12572
  Discoloured decorative surface, due pores close to surface.

Example 4

Powder Based Product Obtained Through Heat Compression of a Treated Powder, Preferred Example, Drying and without Stabilization Fluid of Water A powder based product comprising a HDF core with a thickness of 9.7 mm, a balancing paper and 550 g/m² of a scattered powder layer, with a loss on cure of 5.3% before drying, was pressed in a short cycle press using a force of 40 kg/cm² for 37 seconds at a surface temperature on the upper press plate of 184° C. and a surface temperature on the lower press plate of 180° C. The press plate had a granite structure. Prior to pressing the powder was treated by an IR drying with an effect of 19 kW/m and a feeding speed of 2.7 m/min in order to obtain a loss on cure of 3.7 wt-% as measured using a gravimetric method comprising heating the treated at 160° C. for five minutes.

The resulting product was:
  A solid surface having a width cupping within −0.15% to +0.2% on the installed board according to ISO 24339:2006(E), typical values obtained are −0.05% to +0.20%.
  staining of 5(5) according to EN438 based on test using a permanent marker
  water vapour permeability lower than 1.9 g/m²*24 hours according to EN 12572.

The invention claimed is:

1. A method of producing a building panel comprising the steps of:
   applying a powder mix layer on a substrate, the powder mix layer comprising a fiber and a binder; and
   applying heat and pressure to the powder mix layer and curing the powder mix layer having a loss on cure in the range of about 2 to about 7 wt-%, and thereby obtaining a layer of the building panel formed by the powder mix layer.

2. The method according to claim 1, wherein the powder mix layer comprises wood fibres and a binder.

3. The method according to claim 2, wherein the substrate is a wood-based core and the substrate is a core of the building panel.

4. The method of claim 3, the method further comprising determining the loss on cure for the powder mix layer.

5. The method of claim 4, the method further comprising adjusting the loss on cure of the powder mix layer by a step of applying a stabilisation fluid, or a step of drying, or a combination thereof, such that the powder mix layer obtains the loss on cure in said range.

6. The method according to claim 3, wherein the powder mix layer has a loss on cure in the range of about 3.5 to about 5.5 wt-%.

7. The method according to claim 1, comprising the further step of applying a stabilisation fluid on the powder mix layer.

8. The method according to claim 7, further comprising adjusting the loss on cure of the powder mix layer by a step of applying the stabilisation fluid, or a step of drying, or a combination thereof such that the powder mix layer obtains the loss on cure in said range.

9. The method of claim 7, the method further comprising determining the loss on cure for the powder mix layer.

10. The method of claim 9, the method further comprising adjusting the loss on cure of the powder mix layer by a step of applying the stabilisation fluid, or a step of drying, or a combination thereof, such that the powder mix layer obtains the loss on cure in said range.

11. The method according to claim 1, comprising the further step of drying the powder mix layer.

12. The method according to claim 11, wherein the step of drying comprises applying heat with an effect of about 15-25 kW/m and a feeding speed of the substrate in the range of about 1-4 m/min.

13. The method according to claim 1, comprising the further step of fixing the powder mix layer to the substrate.

14. The method according to claim 13, wherein the step of fixing comprises applying stabilisation fluid and drying with an effect of about 15-25 kW/m and a feeding speed of the substrate in the range of about 1-4 m/min.

15. The method according to claim 1, wherein the powder mix layer is applied by scattering.

16. The method according to claim 1, wherein the powder mix layer is applied as a continuous powder mix sheet.

17. The method according to claim 1, wherein the substrate is a core of the building panel.

18. The method according to claim 17, wherein the layer forms a decorative surface layer arranged on the core.

19. The method according to claim 17, wherein the substrate is a wood-based core.

20. The method according to claim 1, wherein the powder mix layer has a loss on cure in the range of about 2.5 to about 7 wt-%.

21. The method according to claim 1, wherein the powder mix layer has a loss on cure in the range of about 3 to about 6 wt-%.

22. A method of producing a building panel comprising the steps of:
- applying a powder mix layer on a substrate, the powder mix layer comprising a fiber and a binder;
- determining the loss on cure for the powder mix layer and, if outside the range of about 2 to about 7 wt-%, adjusting the loss on cure of the powder mix layer by a step of applying a stabilisation fluid, or a step of drying, or a combination thereof, such that the powder mix layer obtains the loss on cure in said range; and
- applying heat and pressure to the powder mix layer and curing the powder mix layer having a loss on cure in the range of about 2 to about 7 wt-%, and thereby obtaining a layer of the building panel formed by the powder mix layer.

* * * * *